(12) United States Patent
Ooki

(10) Patent No.: US 9,994,747 B2
(45) Date of Patent: Jun. 12, 2018

(54) SEAL MEMBER

(71) Applicant: YAZAKI CORPORATION, Tokyo (JP)

(72) Inventor: Yuusaku Ooki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/423,642

(22) Filed: Feb. 3, 2017

(65) Prior Publication Data

US 2017/0145272 A1 May 25, 2017

Related U.S. Application Data

(63) Continuation of application No. PCT/JP2015/074089, filed on Aug. 26, 2015.

(30) Foreign Application Priority Data

Sep. 5, 2014 (JP) .................................. 2014-180917

(51) Int. Cl.
*C09K 3/10* (2006.01)
*C08L 83/04* (2006.01)
*H01R 13/52* (2006.01)

(52) U.S. Cl.
CPC ............ *C09K 3/1018* (2013.01); *C08L 83/04* (2013.01); *H01R 13/5221* (2013.01); *C08L 2203/20* (2013.01); *C08L 2205/05* (2013.01); *C08L 2312/00* (2013.01); *C09K 2003/1068* (2013.01);

(Continued)

(58) Field of Classification Search
None
See application file for complete search history.

(56) References Cited

U.S. PATENT DOCUMENTS 7,622,527 B2 * 11/2009 Ito ............................ B01J 20/26
525/54.4
7,981,943 B2 * 7/2011 Ito ........................ C08G 83/007
522/111

(Continued)

FOREIGN PATENT DOCUMENTS

JP    S55-135186 A    10/1980
JP    2002-231374 A    8/2002

(Continued)

OTHER PUBLICATIONS

Yu et al. "Introduction of ferrocene-containing [2]rotaxanes onto siloxane, silsesquioxane and polysiloxanes via click chemistry" Dalton Trans. 2013, 42, 1476. (Year: 2013).*

(Continued)

*Primary Examiner* — Robert S Loewe
(74) *Attorney, Agent, or Firm* — Metrolexis Law Group, PLLC

(57) ABSTRACT

A seal member includes silicone rubber mixed with a polyrotaxane. The seal member includes the polyrotaxane in an amount of 3 to 10 parts by mass per 100 parts by mass of the silicone rubber. This configuration can allow molecules in the silicone rubber to slide on one another, so that the rubber material is easily deformed according to stress applied, such as insertion and removal of terminal metal pieces. Accordingly, scratch damage of the seal member can be reduced.

1 Claim, 9 Drawing Sheets

(52) U.S. Cl.
CPC .............. *C09K 2200/0602* (2013.01); *C09K 2200/0685* (2013.01)

(56) References Cited

U.S. PATENT DOCUMENTS

| | | | |
|---|---|---|---|
| 2003/0138398 A1* | 7/2003 | Okumura | A61K 47/40 424/78.38 |
| 2009/0030108 A1 | 1/2009 | Ito et al. | |
| 2013/0223886 A1* | 8/2013 | Miyagawa | G03G 15/0233 399/176 |
| 2015/0200039 A1* | 7/2015 | Taguchi | C08L 21/00 310/363 |
| 2015/0218323 A1* | 8/2015 | Kim | H01L 51/5253 257/88 |

FOREIGN PATENT DOCUMENTS

| | | |
|---|---|---|
| JP | 2006-241396 A | 9/2006 |
| JP | 2006-316089 A | 11/2006 |
| JP | 2007-92024 A | 4/2007 |
| JP | 2007-106861 A | 4/2007 |
| JP | 2009-51994 A | 3/2009 |
| JP | 2011-165330 A | 8/2011 |
| JP | 2013-91696 A | 5/2013 |
| JP | 2014-118481 A | 6/2014 |
| WO | 01/83566 A1 | 11/2001 |
| WO | 2006/090819 A1 | 8/2006 |
| WO | 2006/115255 A1 | 11/2006 |

OTHER PUBLICATIONS

Official action dated Nov. 21, 2017 in the counterpart Japanese patent application.
Written Opinion of the International Searching Authority (Form PCT/ISA/237) dated Sep. 29, 2015 in PCT international application PCT/JP2015/074089 (English translation of the Written Opinion will be issued and uploaded to PATENTSCOPE of WIPO.).

* cited by examiner

SEAL MEMBER

CROSS REFERENCE TO RELATED APPLICATION

This application is a Continuation of PCT Application No. PCT/JP2015/074089, filed on Aug. 26, 2015, and claims the priority of Japanese Patent Application No. 2014-180917, filed on Sep. 5, 2014, the content of all of which is incorporated herein by reference.

BACKGROUND

1. Technical Field

The present invention relates to seal members. More particularly, the present invention relates to a seal member with reduced scratch damage.

2. Related Art

Waterproof connectors have been disclosed in which a mat seal as a seal member is placed into a cable leading part of an outer housing (for example, refer to Patent Literature 1). Such a mat seal has a plurality of insertion holes into which terminal metal pieces and cables are inserted. A waterproof connector is prevented from water permeation such that circumferences of the terminal metal pieces and cables inserted into the insertion holes are brought into close contact with inner surfaces of the insertion holes.

In association with a tendency to reduce the size of connectors, there is an increasing demand for thinner rubber parts and smaller insertion holes provided on mat seals. The size of insertion holes on a mat seal is required to be reduced when used for a cable in accordance with the International Organization for Standardization (ISO) standards, which are much detailed, as compared with a cable in accordance with the conventionally-used Japanese Automotive Standards Organization (JASO) standards.

Patent Literature 1: Japanese Unexamined Patent Application Publication No. 2011-165330

SUMMARY

Even through the size of insertion holes on a mat seal is reduced, the size of terminal metal pieces attached to tips of cables remains the same. Therefore, there is a problem with the mat seal that may be scratched when the terminal metal pieces are inserted into the insertion holes of which the size is reduced. The mat seal with the scratched insertion holes are hindered from exhibiting sealing performance, which may cause a short circuit because of water entering a connector.

The present invention has been made in view of the above-described conventional problems. An object of the present invention is to provide a seal member with reduced scratch damage.

A seal member according to a first aspect of the present invention includes silicone rubber mixed with a polyrotaxane.

A seal member according to a second aspect of the present invention is the seal member according to the first aspect, wherein the polyrotaxane is mixed in an amount of 3 to 10 parts by mass per 100 parts by mass of the silicone rubber.

DETAILED DESCRIPTION

Figure 1:
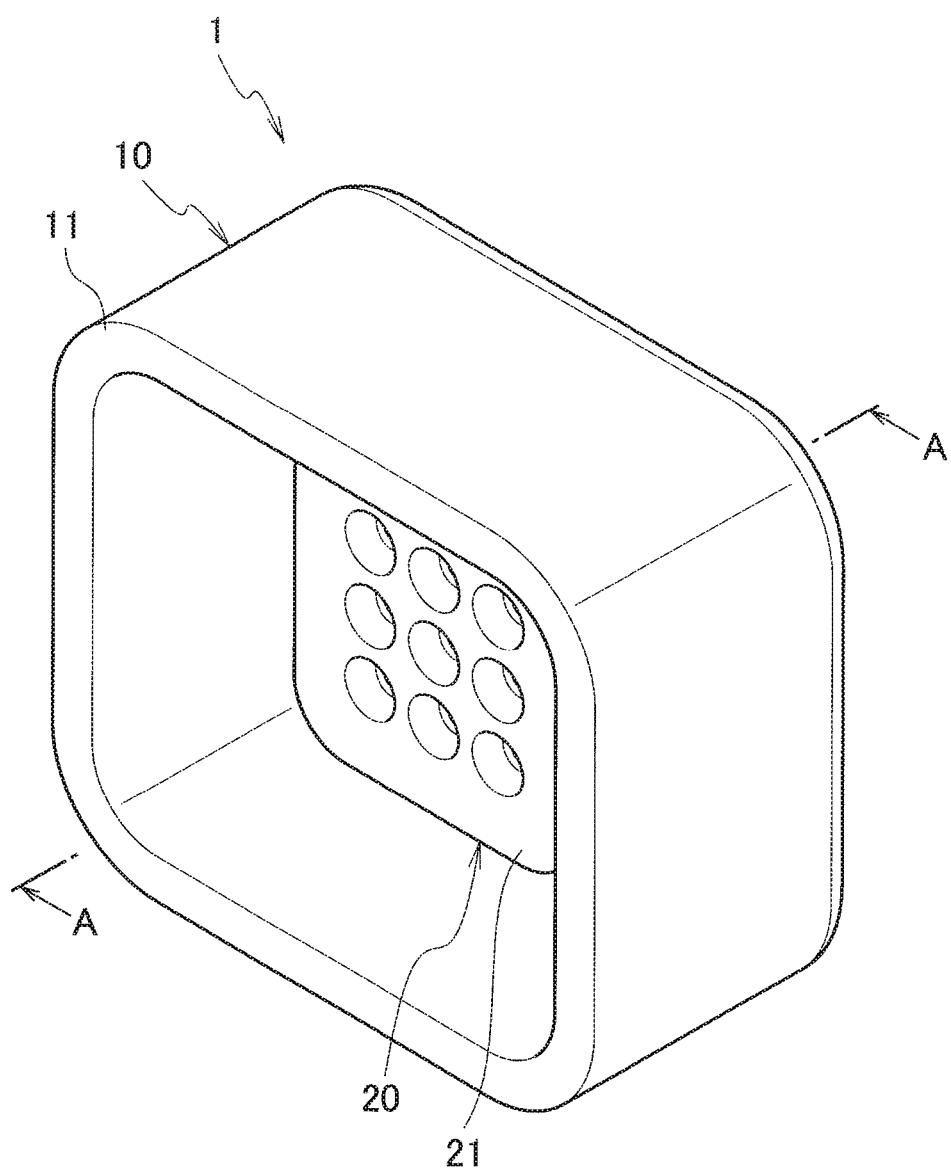
FIG. 1 is a perspective view illustrating a structure of an outer housing provided with a mat seal used for a waterproof connector.

A seal member according to an embodiment of the present invention will be described in detail below with reference to the drawings. The dimensions in the drawings may be exaggerated for illustration purposes, and are not necessarily drawn to scale.

The seal member according to the present embodiment is characterized in that silicone rubber as a base material is mixed with a polyrotaxane.

The silicone rubber as a base material has almost no influence on mechanical strength and electrical characteristics when soaked in water for a long period of time, and therefore has high water resistance. An example of such silicone rubber may be thermosetting silicone rubber.

In particular, the silicone rubber may be obtained such that a silicone composition including at least the following four raw materials (A) to (D) is thermally cured.

(A) an organopolysiloxane including at least two alkenyl groups per molecule;

(B) an organopolysiloxane including at least two hydrogen atoms bonded to silicon atoms per molecule;

(C) an organopolysiloxane without alkenyl group or hydrogen atom bonded to silicon atoms in a molecule; and (D) a platinum-based curing catalyst The organopolysiloxane of the constituent (A) is a main agent of the silicone composition. Examples of alkenyl groups include a vinyl group, an allyl group, a butenyl group, a pentenyl group, and a hexenyl group. Examples of organic groups bonded to the silicon atoms in the constituent (A) other than the alkenyl groups include: an alkyl group such as a methyl group, an ethyl group, and a propyl group; an aryl group such as a phenyl group, and a tolyl group; and an alkyl halide group such as a 3,3,3-trifluoropropyl group.

An example of the organopolysiloxane of the constituent (A) is a dimethylpolysiloxane in which a dimethylvinylsiloxy group is added to both ends of a molecular chain. Another example is a dimethylsiloxane-methylvinylsiloxane copolymer in which a dimethylvinylsiloxy group is added to both ends of a molecular chain.

The organopolysiloxane of the constituent (B) is a curing agent. Examples of organic groups bonded to the silicon atoms in the constituent (B) include: an alkyl group such as a methyl group, an ethyl group, and a propyl group; an aryl group such as a phenyl group, and a tolyl group; and an alkyl halide group such as a 3,3,3-trifluoropropyl group.

An example of the organopolysiloxane of the constituent (B) is a dimethylpolysiloxane in which a dimethylhydrogensiloxy group is added to both ends of a molecular chain. Another example is a methylhydrogenpolysiloxane in which a trimethylsiloxy group is added to both ends of a molecular chain.

The organopolysiloxane of the constituent (C) is used for improving mold release performance of silicone rubber obtained by curing the silicone composition, and for ensuring sufficient flexibility while minimizing a compression set. Examples of organic groups bonded to the silicon atoms in the constituent (C) include: an alkyl group such as a methyl group, an ethyl group, and a propyl group; an aryl group such as a phenyl group, and a tolyl group; and an alkyl halide group such as a 3,3,3-trifluoropropyl group.

An example of the organopolysiloxane of the constituent (C) is a dimethylpolysiloxane in which a trimethylsiloxy group is added to both ends of a molecular chain. Another example is a dimethylsiloxane-methylphenylsiloxane copolymer in which a trimethylsiloxy group is added to both ends of a molecular chain.

The platinum-based curing catalyst of the constituent (D) is used for promoting the performance of curing the silicone composition. Examples of such curing catalysts include a platinum catalyst such as platinum fine powder, platinum black, chloroplatinic acid, platinum tetrachloride, an alcohol solution of chloroplatinic acid, a platinum-olefin complex, a platinum-alkenylsiloxane complex, and a platinum-carbonyl complex; a rhodium catalyst; and a palladium catalyst.

These constituents (A) to (D) are mixed and heated together, so that the constituents (A) to (C) are polymerized while the constituent (D) is used as a catalyst, so as to obtain the silicone rubber as a base material.

The silicone rubber used as a base material in the seal member of the present embodiment may be a peroxide crosslinking silicone rubber, instead of the thermosetting silicone rubber. The peroxide crosslinking silicone rubber is obtained such that silicone rubber is cross-linked by an organic peroxide used as a vulcanizing agent. An example of the peroxide crosslinking silicone rubber is silicone rubber cross-linked to at least one kind selected from the group consisting of a polydimethylsiloxane, a polydimethylsiloxane having vinyl at an end, a vinylmethylsiloxane-polydimethylsiloxane copolymer, a polyphenylmethylsiloxane having vinyl at an end, a polyvinylmethylsiloxane having a trimethylsiloxy group at an end, a polydimethylsiloxane having a methacryloxypropyl group at an end, and a polydimethylsiloxane having an acryloxypropyl group at an end.

Examples of organic peroxides include ketone peroxides, diacyl peroxides, hydroperoxides, dialkyl peroxides, peroxyketals, alkyl peresters, and percarbonates. The silicone rubbers and the organic peroxides listed above may be used alone or in combination.

The silicone rubber used as a base material may be oil-containing silicone rubber containing silicone oil, for example, in order to improve mold release performance. The silicone oil may be either straight silicone oil such as dimethyl silicone oil and methylphenyl silicone oil, or modified silicone oil such as alkyl-modified silicone oil and aralkyl-modified silicone oil.

The hardness (durometer A) of the silicone rubber in the seal member of the present embodiment is not particularly limited. However, a higher hardness tends to cause scratches on the seal member because the seal member obtained is not easily deformed when external stress is applied thereto. The hardness of the silicone rubber is therefore preferably in the range of 10 to 50 degrees, more preferably in the range of 15 to 40 degrees. The hardness (durometer A) of the silicone rubber may be measured according to JIS K6253-3 (Rubber, vulcanized or thermoplastic-Determination of hardness-Part 3: Durometer method).

The seal member of the present embodiment includes a composition to which a polyrotaxane is added in order that external stress applied to the silicone rubber is easily dispersed and released. The polyrotaxane has a structure in which a chain-like molecule penetrates a cyclic molecule, and both ends of the chain-like molecule are blocked with bulky molecules. This structure prevents the linear molecule from coming out of the cyclic molecule.

The cyclic molecule included in the polyrotaxane may be any molecule which has a ring through which the chain-like molecule can pass. The cyclic molecule may be at least one kind selected from the group consisting of cyclodextrins, crown ethers, cryptands, macrocyclic amines, calixarenes, and cyclophanes. Cyclodextrins are particularly preferable, since the surface of the cyclic molecule can easily be modified.

A cyclodextrin is a compound in which glucose units are joined into a ring by α-1,4 linkages. Among cyclodextrins, α-, β-, or γ-cyclodextrin having six, seven, or eight glucose units is preferable. Modified dextrins in which at least one of hydroxyl groups of a cyclodextrin is replaced with another organic group are particularly preferable because of improved solubility in a solvent and easy reaction with the silicone rubber.

The chain-like molecule may be any molecule which has, at both ends, a functional group which may be bonded to a bulky molecule. Examples of terminal functional groups include a hydroxyl group, an amino group, and a carboxyl group. An example of the chain-like molecule may be at least one kind selected from the group consisting of: polyalkylene glycols such as polyethylene glycol, polypropylene glycol, and polytetramethylene glycol; hydroxyl-terminated polyolefins such as polybutadiene diol, polyisoprene diol, polyisobutylene diol, poly(acrylonitrile-butadiene) diol, hydrogenated polybutadiene diol, polyethylene diol, and polypropylene diol; polyesters such as polycaprolactone diol, polylactic acid, polyethylene adipate, polybutylene adipate, polyethylene terephthalate, and polybutylene terephthalate; terminal functional polysiloxanes such as silanol-terminated polydimethylsiloxane; and amino-terminated chain molecules such as amino-terminated polyethylene glycol, amino-terminated polypropylene glycol, and amino-terminated polybutadiene.

The terminal bulky molecule may be any molecule which has a bulky group bonded to the terminal functional group of the chain-like molecule so that the cyclic molecule cannot come off. An example of the bulky group may be at least one kind selected from the group consisting of an adamantane group, a 2,4-dinitrophenyl group, a trityl group, a dansyl group, a 2,4,6-trinitrophenyl group, a triisopropylsilyl group, a naphthalene derivative group, and an anthracene derivative group.

The polyrotaxane is preferably polyethylene glycol in which the cyclic molecule is a cyclodextrin (CD) and the chain-like molecule has a functional group at both ends, as represented by chemical formula 1. A preferable polyrotaxane is obtained such that the terminal hydroxyl group of such polyethylene glycol is modified into an amide group, and an amino group is blocked by a bulky group such as an adamantane group.

[Chem. 1]

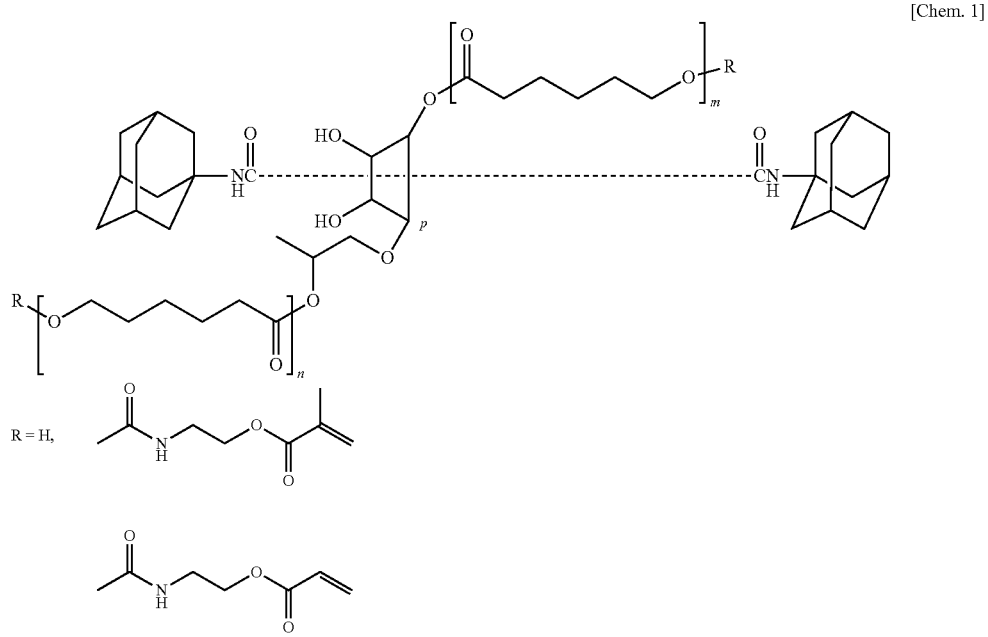

When the cyclic molecule is a cyclodextrin, a number of hydroxyl groups are present on the surface of the cyclic molecule When the respective cyclic molecules are cross-liked and/or the cyclic molecule and the silicone rubber are cross-linked through the hydroxyl groups used as cross-linking points, a supermolecular network is established in which the cross-linking points freely slide. The sliding of the cross-linking points contributes to equalization of tension inside the seal member, so that the rubber material is easily deformed according to stress applied, such as insertion and removal of terminal metal pieces. Accordingly, scratch damage of the seal member can be reduced.

In order that the cyclic molecule of the polyrotaxane and the silicone rubber are easily cross-linked, the surface of the cyclic molecule is preferably modified by at least one of an acryl group and a methacryl group. The acryl group and the methacryl group are easily polymerized with an unsaturated bond present in the silicone rubber, so that the supermolecular network is easily established.

The seal member of the present embodiment preferably includes the polyrotaxane mixed in the amount of 3 to 10 parts by mass per 100 parts by mass of the silicone rubber. The polyrotaxane present in the amount of 3 parts by mass or greater facilitates the deformation of the silicone rubber, so as to reduce scratch damage of the seal member. The polyrotaxane present in the amount of 10 parts by mass or less suppresses modification of the silicone rubber, so as to prevent a decrease of waterproof and dustproof performance. The polyrotaxane is more preferably included in the amount of 5 to 10 parts by mass per 100 parts by mass of the silicone rubber. The polyrotaxane present in the amount of 5 parts by mass or greater can improve scratch resistance and sealing performance when the hardness of the silicone rubber is increased. The polyrotaxane present in the amount of 7 to 10 parts by mass per 100 parts by mass of the silicone rubber can greatly reduce the scratch damage while keeping the high sealing performance.

A low hardness of the silicone rubber can reduce the scratch damage of the seal member with the small amount of the polyrotaxane included. When the hardness of the silicone rubber is 25 degrees or less, the polyrotaxane is preferably included in the amount of 3 to 10 parts by mass per 100 parts by mass of the silicone rubber. When the hardness of the silicone rubber exceeds 25 degrees, the polyrotaxane is preferably included in the amount of 5 to 10 parts by mass per 100 parts by mass of the silicone rubber.

The seal member of the present embodiment may further include various kinds of additives in addition to the materials described above. Examples of additives include an inorganic filler, a polymerization initiator, a retarder, a compression set improver, a reinforcing agent, a viscosity modifier, a heatproof imparting agent, a flame retardant, a thermal conductive filler, an electrical conductivity imparting agent, and an adhesion imparting agent.

The seal member of the present embodiment can be obtained such that a mixture of the silicone rubber and the polyrotaxane is cured. More particularly, the silicone rubber and the polyrotaxane described above and further additives as necessary are mixed together to prepare a mixture. The resin mixture is placed into a metal mold and heated, so as to cure the silicone rubber and the polyrotaxane. The cured product is removed from the metal mold to obtain the seal member.

As described above, the seal member of the present embodiment is easily deformed according to external stress applied, so as to reduce scratch damage. The seal member is therefore applicable to a mat seal, a rubber plug, and a gasket for a waterproof connector. First, a mat seal to which the seal member can be applied is described below.

FIG. 1 is a waterproof connector equipped with a mat seal formed of the seal member according to the present embodiment. The waterproof connector 1 includes an outer housing 10 and an inner housing (not shown) which are moldings of hard synthetic resin, and a mat seal 20.

Figure 2A:
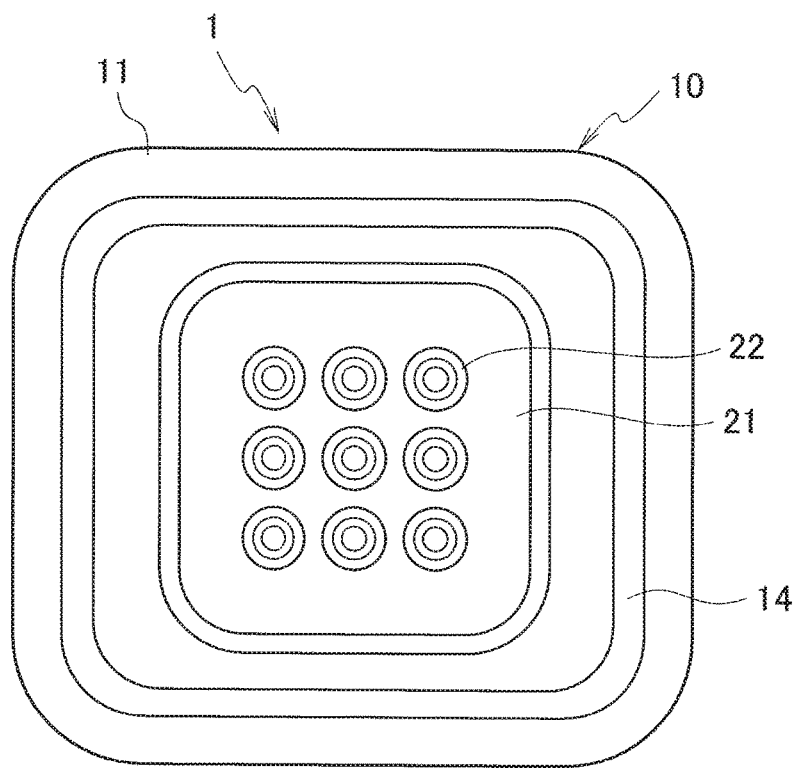
FIG. 2A is a front view illustrating the structure of the outer housing provided with the mat seal.
Figure 2B:
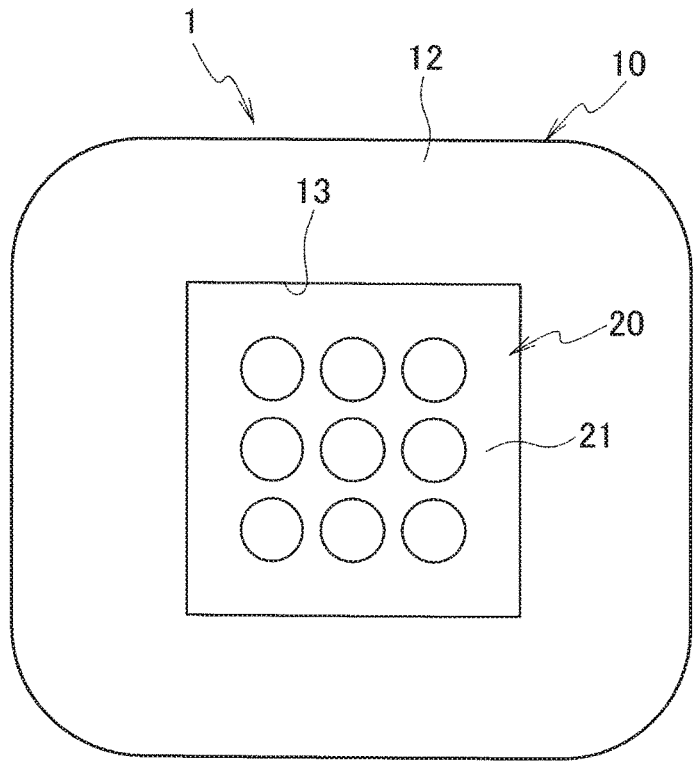
FIG. 2B is a rear view illustrating the structure of the outer housing provided with the mat seal.
Figure 3:
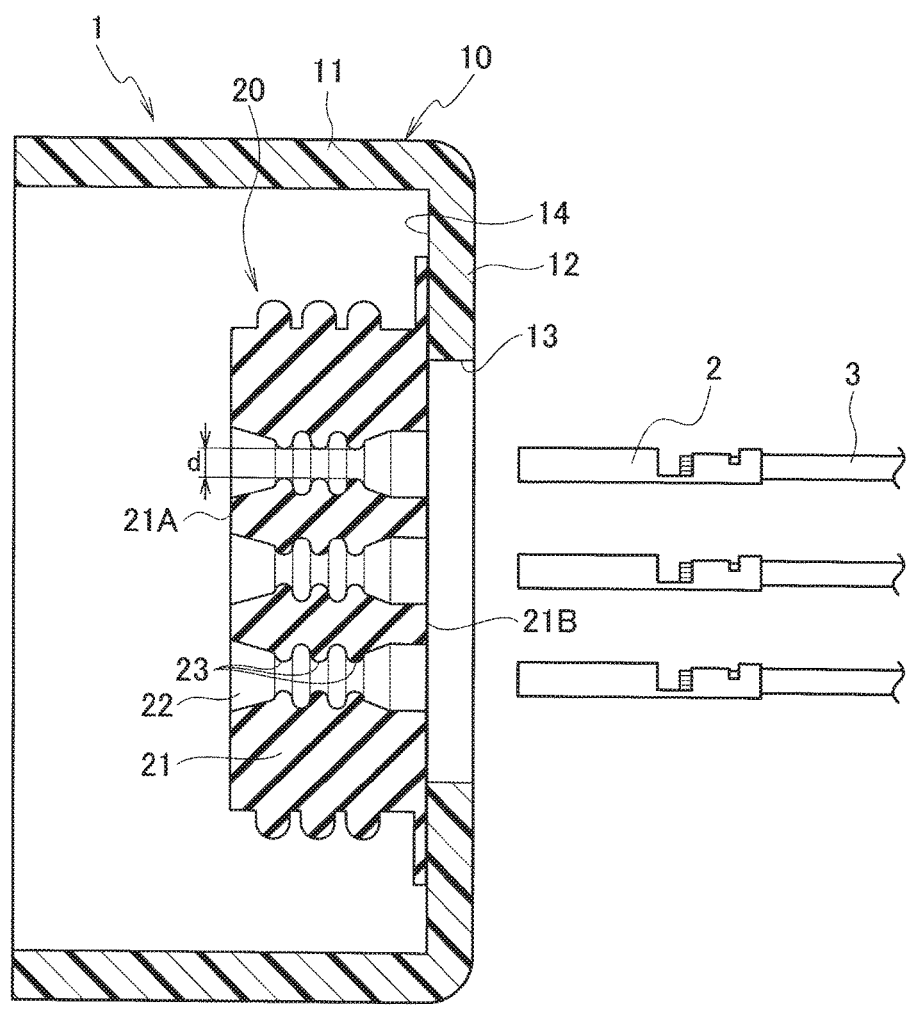
FIG. 3 is a cross-sectional view of the outer housing taken along line A-A in FIG. 1, while illustrating together with terminal metal pieces and cables.

As shown in FIG. 2 and FIG. 3, the outer housing 10 includes a columnar hood 11 extending forward, and a rear wall 12 closing up the rear end of the hood 11. The rear wall 12 is provided with a rectangular hole 13 through which terminal metal pieces 2 are inserted into terminal metal housings of the inner housing. Each cable 3 includes a core and a covering material covering the core, and the terminal metal piece 2 is attached to the tip of the cable 3.

Although not shown, the inner housing is provided with a plurality of terminal metal housings into which the terminal metal pieces 2 can be inserted from the rear end of the inner housing. The surface of the rear end of the inner housing is a seal setting surface closely attached to a front surface 21A of the mat seal 20.

The mat seal 20 is placed at a cable leading part 14 on the rear side of the outer housing 10, so as to protect a gap between the outer housing 10, the inner housing, and the cables 3 from water. The mat seal 20 is integrally molded on the inner surface of the rear wall 12 of the outer housing 10 to cover the rectangular hole 13 of the outer housing 10. The seal setting surface at the rear end of the inner housing is closely attached to the front surface 21A of the mat seal 20.

The mat seal 20 includes a seal body 21 having a substantially rectangular plate shape of which the front surface 21A and a rear surface 21B are substantially parallel to each other. The seal body 21 is provided with a plurality of insertion holes 22 into which the respective cables 3 are inserted. The insertion holes 22 are provided, on inner circumferential surfaces thereof, with ring-shaped inner circumferential lips 23 brought in close contact with outer circumferences of cables 3. Each inner circumferential lip 23 is provided with several steps at intervals in the axial direction on the inner circumferential surface of the insertion hole 22. The terminal metal piece 2 attached to the tip of the cable 3 is inserted into the insertion hole 22 while expanding the insertion hole 22 by use of elasticity of the mat seal 20, so that the inner circumferential lip 23 comes in close contact with the outer circumference of the cable 3 when the terminal metal piece 2 penetrates to the other side of the insertion hole 22. As a result, the gap between the insertion hole 22 and the cable 3 is sealed.

As described above, the mat seal formed of the seal member of the present embodiment is easily deformed according to the external stress applied. Therefore, the circumference of each insertion hole 22 can be prevented from being scratched by the end portion of the terminal metal piece 2 when the terminal metal piece 2 is inserted into the insertion hole 22 while expanding the insertion hole 22.

Figure 4:
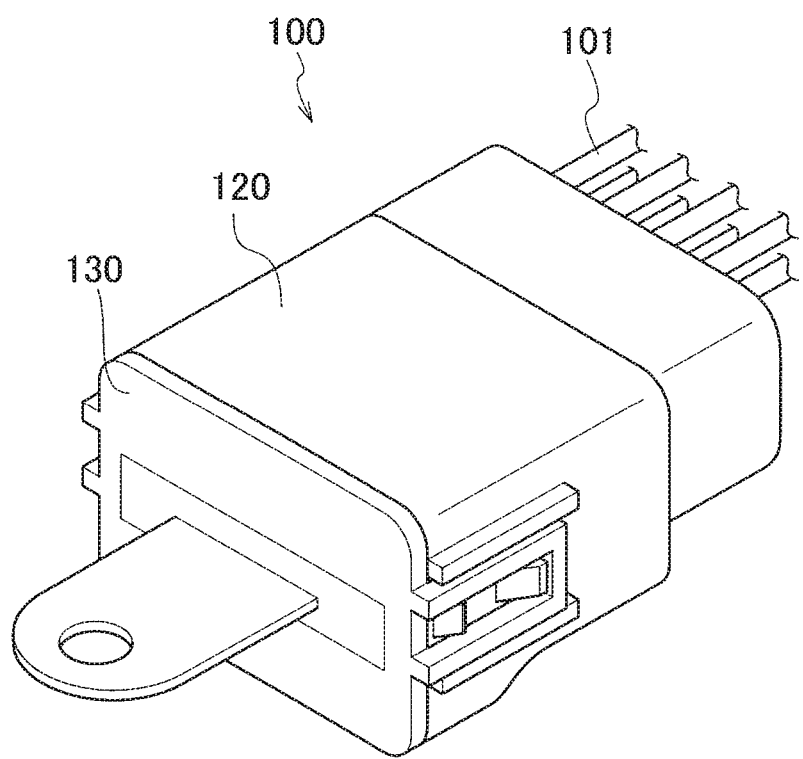
FIG. 4 is a perspective view illustrating a joint connector in a fitted state.
Figure 5:
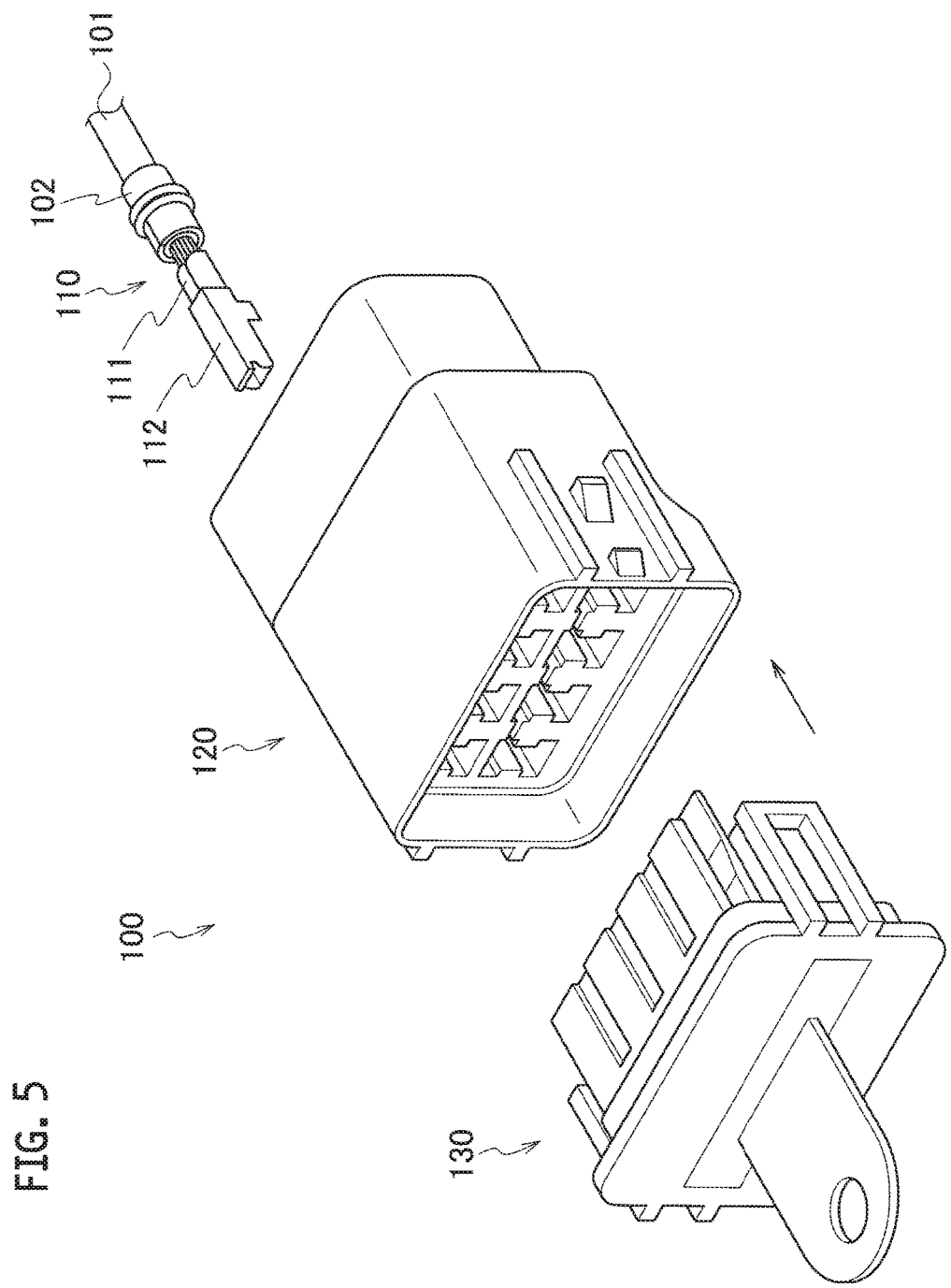
FIG. 5 is a perspective view of the joint connector in a separate state.
Figure 6:
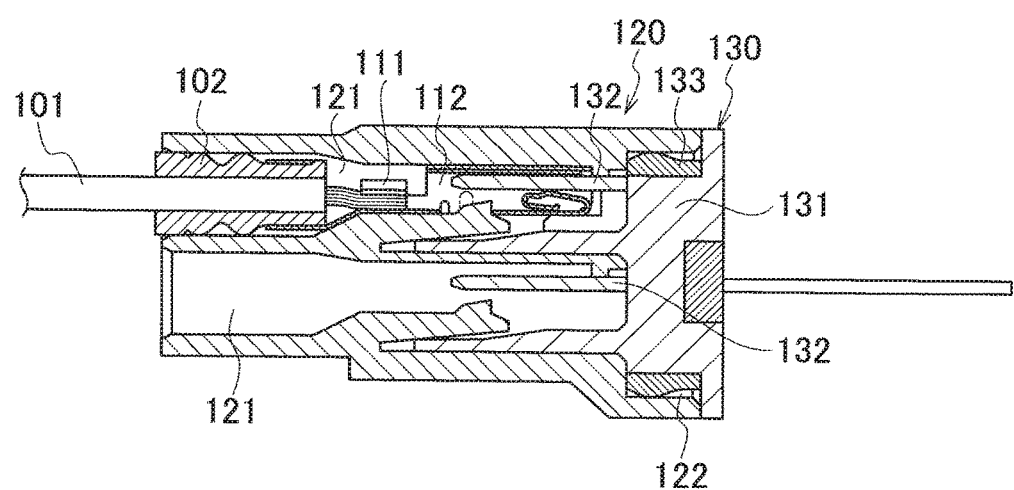
FIG. 6 is a cross-sectional view of the joint connector in a fitted state.

Next, a rubber plug and a gasket to which the seal member can be applied are described below. FIG. 4 to FIG. 6 each show a joint connector equipped with a rubber plug and a gasket. The joint connector 100 includes a plurality of terminal metal pieces 110 connected to cables 101, and a connector housing 120 to which the terminal metal pieces 110 are attached. The joint connector 100 further includes a front holder 130 attached to the connector housing 120 on the side opposite to the side from which the terminal metal pieces 110 are inserted.

Each cable 101 includes a core and a covering material covering the core. The cable 101 is provided, at a terminal end (an end portion to which the terminal metal piece 110 is attached), with a rubber plug 102 for preventing water or the like from entering the connector housing 120. As shown in FIG. 6, the terminal metal piece 110 is attached to the circumference of the rubber plug 102.

The terminal metal piece 110 includes a crimp part 111 with which the cable 101 is crimped, and a contact part 112 located closer to the tip than the crimp part 111 and brought into contact with a busbar 132. The connector housing 120 is provided with a plurality of terminal metal housings 121 in which the terminal metal pieces 110 are housed, and a holder housing 122 in which the front holder 130 is housed.

As shown in FIG. 4 to FIG. 6, the front holder 130 includes a holder body 131, and the busbar 132 and a gasket 133 integrated with the holder body 131. The holder body 131 is attached to the holder housing 122. The busbar 132 functions to connect the terminal metal pieces 110 to each other.

The gasket 133 prevents water or the like from entering the connector housing 120. The gasket 133 is formed into a ring shape and is in close contact with the inner surface of the holder housing 122 and the outer surface of the holder body 131.

As described above, the rubber plug formed of the seal member of the present embodiment is easily deformed according to the external stress applied. Even when the size of the rubber plug is decreased in association with a decrease of size of a connector housing, the rubber plug can be prevented from being scratched when the terminal metal piece is crimped. Further, even when the thickness of the gasket is decreased in association with a decrease of size of a connector housing, the gasket can be prevented from being scratched while being held between the connector housing 120 and the front holder 130.

The seal member according to the present embodiment includes the silicone rubber mixed with the polyrotaxane, as described above. Accordingly, molecules in the silicone rubber can slide on one another, and the rubber material is easily elongated and deformed according to stress applied, such as insertion and removal of the terminal metal pieces, so as to reduce scratch damage of the seal member. Further, the addition of the polyrotaxane can disperse the stress, so as to ensure high elongation and strength. The use of the silicone rubber mixed with the polyrotaxane eases restrictions on dimensions, such as a hole diameter and a thickness, so as to expand the possibility of design of the seal component. The seal member of the present embodiment can therefore contribute to a reduction in side of a connector, for example. The seal member according to the present embodiment may be applicable not only to the mat seal, the rubber plug, and the gasket as described above, but also to any parts which are required to have water and dust resistance.

EXAMPLES

Hereinafter, the present invention is described in more detail with reference to examples and comparative examples, but is not limited to these examples.

[Preparation of Test Samples]

As oil-containing silicone rubber, X-30-3421 (trade name, available from Shin-Etsu Chemical Co., Ltd.) having a hardness of 20, and X-30-4175 (trade name, available from Shin-Etsu Chemical Co., Ltd.) having a hardness of 30 were prepared. As a polyrotaxane, SeRM (registered trademark) Super Polymer SA3405P (available from Advanced Softmaterials Inc.) was prepared. The polyrotaxane as used herein is obtained such that a surface of a cyclodextrin as a ring-shaped molecule is modified by methacrylic acid, wherein an average amount of a linear molecule is approximately 35000.

The oil-containing silicone rubber and the polyrotaxane were mixed in the proportion shown in Table 1 and Table 2, placed into a metal mold, and heated at 180° C. so as to be cured. Accordingly, a test mat seal 20 illustrated in FIG. 1 to FIG. 3 was manufactured. The test mat seal 20 thus obtained was provided with insertion holes 22 each having a diameter d of 0.65 mm.

Figure 7:
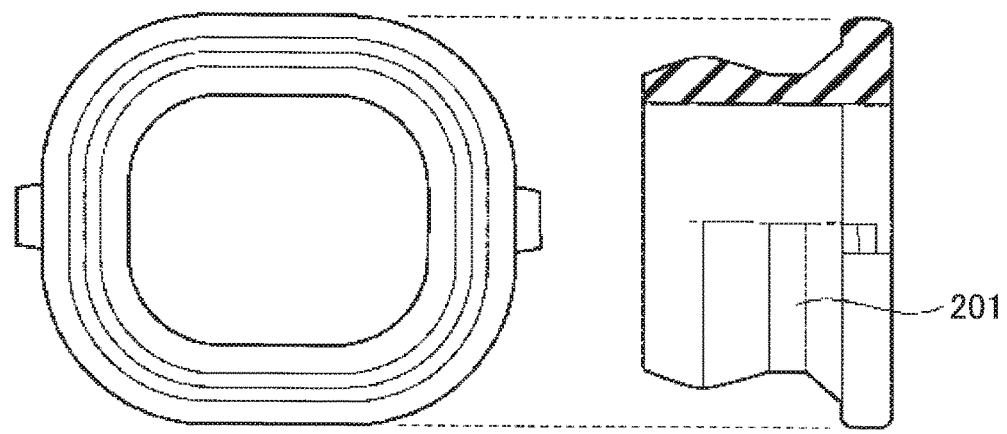
FIG. 7 is a schematic view of a test gasket used in examples.

Further, the oil-containing silicone rubber and the polyrotaxane were mixed in the proportion shown in Table 1 and Table 2, placed into a metal mold, and heated at 180° C. to be cured, so as to manufacture a plate-like test piece and a test gasket 201 illustrated in FIG. 7.

width was set to 1.70 mm. The evaluation results of the scratch damage test are summarized in Table 1 and Table 2.
A: Eight times or more
B: Four times or more and seven times or less
C: Less than two

TABLE 1

| | | Silicone Rubber with Hardness of 20 Degrees | | | | |
|---|---|---|---|---|---|---|
| Composition (Parts by Mass) | Base Rubber (Oil-containing Silicone Rubber) | 100 | 100 | 100 | 100 | 100 |
| | Polyrotaxane | 0 | 3 | 5 | 7 | 10 |
| General Characteristics | Specific Gravity (23° C.) | 1.05 | 1.05 | 1.05 | 1.05 | 1.05 |
| | Hardness (Durometer A) | 20 | 19 | 19 | 19 | 19 |
| | Tensile Strength (MPa) | 2.1 | 2.8 | 3.3 | 4.0 | 4.1 |
| | Elongation at Break (%) | 700 | 800 | 900 | 1000 | 1000 |
| | Tear Strength (kN/m) Crescent Shape with Notch | 4.0 | 4.6 | 5.0 | 6.1 | 6.0 |
| Product Performance | Scratch Damage upon Insertion and Removal of Terminal | C | B | B | A | A |
| | Sealing Performance | F | S | S | S | S |

TABLE 2

| | | Silicone Rubber with Hardness of 30 Degrees | | | | |
|---|---|---|---|---|---|---|
| Composition (Parts by Mass) | Base Rubber (Oil-containing Silicone Rubber) | 100 | 100 | 100 | 100 | 100 |
| | Polyrotaxane | 0 | 3 | 5 | 7 | 10 |
| General Characteristics | Specific Gravity (23° C.) | 1.11 | 1.11 | 1.11 | 1.11 | 1.11 |
| | Hardness (Durometer A) | 30 | 30 | 29 | 29 | 29 |
| | Tensile Strength (MPa) | 7.0 | 7.2 | 7.8 | 8.1 | 7.8 |
| | Elongation at Break (%) | 850 | 890 | 950 | 1000 | 1000 |
| | Tear Strength (kN/m) Crescent Shape with Notch | 16.0 | 16.2 | 17.7 | 22.1 | 21.2 |
| Product Performance | Scratch Damage upon Insertion and Removal of Terminal | C | C | B | A | A |
| | Sealing Performance | F | F | S | S | S |

A specific gravity, hardness (durometer A), tensile strength, elongation at break, and tear strength of the plate-like test piece (having a crescent shape with a notch) obtained as described above were measured. The specific gravity was measured by a substitution method in accordance with Japanese Industrial Standards JIS K6220-1 (Rubber compounding ingredients-Organic chemicals-Test methods-Part 1: General test methods), while setting a water temperature to 23±2° C. The hardness was measured in accordance with JIS K6253-3 (Rubber, vulcanized or thermoplastic-Determination of hardness-Part 3: Durometer method). The tensile strength and the elongation at break were measured in accordance with JIS K6251 (Rubber, vulcanized or thermoplastic-Determination of tensile stress-strain properties). The tear strength was measured in accordance with JIS K6252 (Rubber, vulcanized or thermoplastic-Determination of tear strength). The measurement results of the respective general characteristics are summarized in Table 1 and Table 2.

[Product Performance Test]
<Scratch Damage Test>

The respective test mat seals obtained as described above were tested such that a cable equipped with a terminal metal piece having a substantially rectangular shape as shown in FIG. 3 and FIG. 5 was inserted into and removed from an insertion hole having a diameter of 0.65 mm, so as to evaluate the scratch damage, based on the following scale, by counting the number of insertion and removal repeated until the mat seal was scratched. The height of the terminal metal piece in cross-section was set to 2.00 mm, and the <Sealing Performance>

Figure 8:
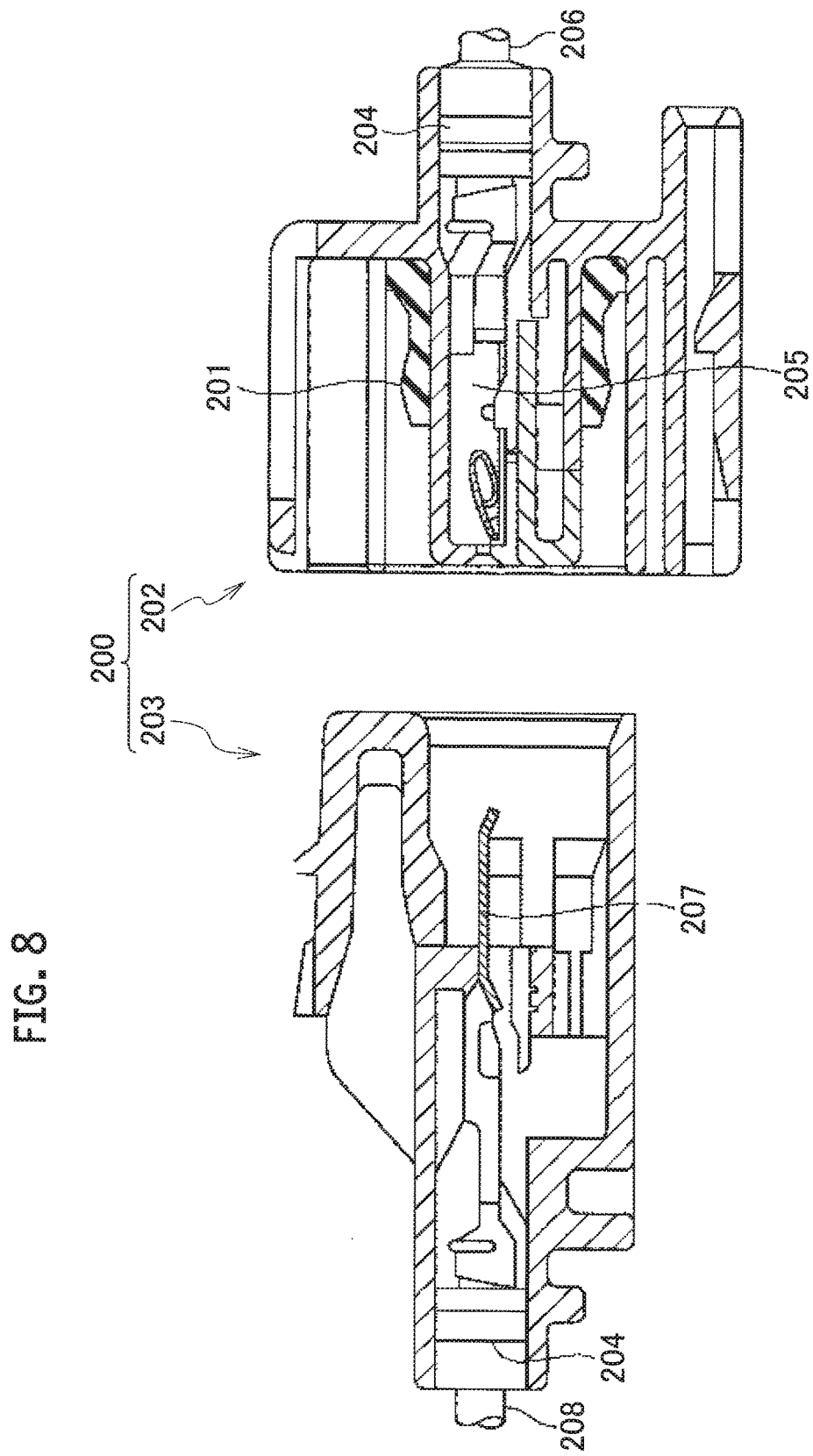
FIG. 8 is a cross-sectional view illustrating a waterproof connector in a separate state used in examples.
Figure 9:
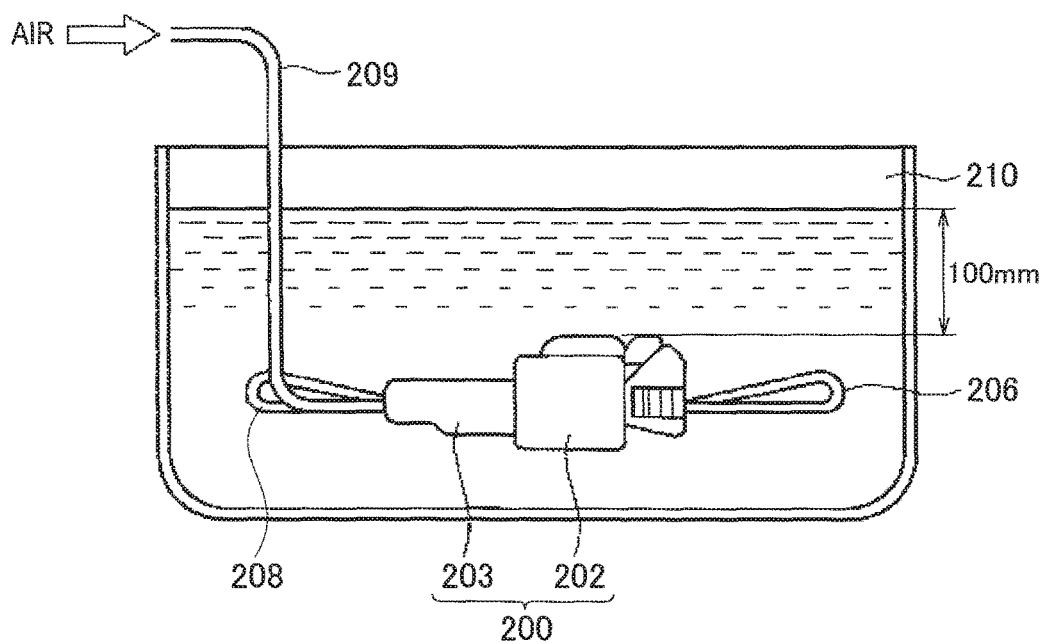
FIG. 9 is a schematic view illustrating a method of testing sealing performance of the waterproof connector.

The sealing performance of each test gasket 201 obtained as described above was evaluated by use of a waterproof connector 200 as shown in FIG. 8 and FIG. 9. First, the test gasket 201 was attached to the inside of a female housing 202 of the waterproof connector 200. A rubber plug 204 as shown in FIG. 5 and a cable 206 provided with a terminal metal piece (a female metal terminal) 205 were attached to the female housing 202. Further, the rubber plug 204 and a cable 208 provided with a terminal metal piece (a male metal terminal) 207 were attached to a male housing 203 of the waterproof connector 200.

The tip of the male housing 203 was fitted into the female housing 202 so that the male housing 203 came in close contact with the female housing 202 via the test gasket 201. The male metal terminal 207 was inserted into the female metal terminal 205 so as to come in contact with each other when the male housing 203 was fitted into the female housing 202.

The waterproof connector 200 thus obtained was subjected to a thermal degradation test by heating at 120° C. for 1000 hours in the air. An air tube 209 was inserted into the male housing 203 of the waterproof connector 200 after subjected to the thermal degradation test from a part at which the rubber plug 204 was attached. The waterproof connector 200 equipped with the air tube 209 was sunk into water in a water tank 210 to a depth of 10 cm, as shown in FIG. 9, and air was introduced at 9.5 kPa for 30 seconds into the waterproof connector 200 through the air tube 209. After the air introduction, the presence or absence of air leakage from the waterproof connector 200 was observed, and the air was further introduced for 30 seconds when the air leakage was not observed, while the air pressure was increased by 9.8 kPa. The test was repeated until the air pressure reached 200 kPa so as to determine whether the air leakage was caused. The case in which no air leakage was observed until the air pressure reached 200 kPa was rated "S", and the case in which air leakage was observed before the air pressure reached 200 kPa was rated "F". The evaluation results of the sealing performance test are summarized in Table 1 and Table 2.

As shown in Table 1 and Table 2, the silicone rubber mixed with the polyrotaxane is easily deformed, so as to reduce the scratch damage while increasing the sealing performance. The addition of the polyrotaxane in the amount of 3 to 10 parts by mass, particularly in the amount of 7 to 10 parts by mass per 100 parts by mass of the silicone rubber, can greatly reduce the scratch damage while keeping the high sealing performance. Further, the addition of the polyrotaxane in the amount of 5 to 10 parts by mass per 100 parts by mass of the silicone rubber can reduce the scratch damage even when the hardness of the silicone rubber is increased.

The seal member according to the present invention includes silicone rubber mixed with a polyrotaxane. This configuration can allow molecules in the silicone rubber to slide on one another, so that the rubber material is easily elongated and deformed according to stress applied, such as insertion and removal of terminal metal pieces. Accordingly, scratch damage of the seal member can be reduced.

While the present invention has been described above by reference to the examples, the present invention is not intended to be limited thereto, and various modifications can be made within the scope of the present invention.

The invention claimed is:

1. A seal member comprising silicone rubber mixed with a polyrotaxane,
   wherein the polyrotaxane is mixed in an amount of 5 to 10 parts by mass per 100 parts by mass of the silicone rubber.

\* \* \* \* \*